United States Patent [19]

Rule et al.

[11] 4,191,240

[45] Mar. 4, 1980

[54] HEAT CONDUCTING FILLER MATERIAL FOR MOTOR-CONTAINING DEVICES

[76] Inventors: Clinton Rule, Thurston Rd., Gloucester, Mass. 01930; Peter A. Rubel, 518 Annursnac Hill Rd., Concord, Mass. 01742

[21] Appl. No.: 784,081

[22] Filed: Apr. 4, 1977

[51] Int. Cl.² .......................................... F28F 13/00
[52] U.S. Cl. .......................................... 165/1; 165/79; 165/185; 165/DIG. 7; 165/DIG. 8; 310/43; 310/52; 310/66; 417/424; 425/112; 425/127; 425/383
[58] Field of Search ............... 165/DIG. 7, 79, 80, 165/164, 180, 185, DIG. 8, 1; 417/363, 424; 310/43, 52, 87, 64, 65, 66; 425/383, 384, 112, 127

[56] References Cited

U.S. PATENT DOCUMENTS

| | | | |
|---|---|---|---|
| 2,313,379 | 3/1943 | Wood | 165/185 |
| 2,550,560 | 4/1951 | Heron | 165/DIG. 8 |
| 2,578,917 | 12/1951 | Bisch | 165/164 |
| 2,595,150 | 4/1952 | Lemeshka | 165/DIG. 7 |
| 2,799,793 | 7/1957 | DeCain | 165/DIG. 8 |
| 3,224,501 | 12/1965 | Burdick et al. | 165/185 |
| 3,331,946 | 7/1967 | Bilbro | 165/79 |
| 3,638,055 | 1/1972 | Zimmerman | 310/43 |
| 3,685,926 | 8/1972 | Blum | 417/424 |
| 3,834,458 | 9/1974 | Bilbro et al. | 165/164 |
| 3,916,151 | 10/1975 | Reix | 165/180 |

FOREIGN PATENT DOCUMENTS 1600601  4/1970  Fed. Rep. of Germany .......... 165/164

*Primary Examiner*—Sheldon Richter
*Attorney, Agent, or Firm*—Cesari & McKenna

[57] ABSTRACT

A motor-containing device, particularly a submersible pump of the type including a sealed housing and motor mounted within the housing, includes a heat conducting filler material disposed in the gap between the motor and internal surface of the housing walls to improve the transfer of motor-generated heat from the motor to the housing walls. The filler material is such that it can be disposed in the gap in an initial form or state without concern for matching the exact dimensions of the gap and subsequently transformed while in the gap to provide a layer that fills the gap and provides a path for heat conduction to the housing walls. In one form, the filler material comprises a high memory thermoplastic that is mechanically prestretched into relatively thin sheet form, added to the gap during assembly of the pump, and then expanded in the gap by the application of heat thereto. In another form, the filler material comprises a thermoplastic material exhibiting high thermal expansion. This material is initially cooled to a contracted thickness and then inserted in the gap where it expands naturally to its original or greater thickness in response to increases in the temperature within the housing. In still another form, the filler material comprises a settable liquid such as an epoxy that is injected into the gap in a liquid state and then allowed to set or harden in the gap to provide the heat conducting layer.

14 Claims, 4 Drawing Figures

HEAT CONDUCTING FILLER MATERIAL FOR MOTOR-CONTAINING DEVICES

BACKGROUND OF THE INVENTION

This invention relates generally to motor-containing devices such as pumps, power tools and the like, and more particularly, to means for improving the dissipation of motor-generated heat in such devices.

Numerous devices are known that utilize electric motors to produce useful mechanical motion. For example, many liquid pumps are powered by electric motors. Power tools typically employ electric motors to rotate, reciprocate, or vibrate a tool member that operates on a work piece. In devices of this type, it is common to mount the motor within a protective housing. Operation of the motor results in the generation of heat within the housing. The amount of heat generated depends upon such factors as the motor efficiency, the time periods of continuous motor operation and the mechanical load on the motor. Under various conditions, the rate at which heat is generated by the motor can exceed the rate at which the heat is dissipated through the walls of the housing. As the heat accumulates within the housing, the temperature of the motor and of components adjacent thereto increases. Continued operation of the device under such conditions can, and frequently does, result in serious damage to the motor and other components of the device.

Internal heating problems of the above type are particularly troublesome in devices, such as submersible pumps, in which the motor is enclosed within a sealed or liquid-tight housing. Ideally, in such devices, the motor should be mounted so that the motor casing is in direct contact with the internal surface of the housing walls to facilitate direct heat conduction to the housing walls whence it is dissipated in the liquid surrounding the housing. In practice, however, because of manfacturing tolerances and other considerations such as ease and economy of assembly, a gap inevitably remains between the motor casing and the internal housing surface. This gap, even if relatively small, typically contains stagnant air which insulates the motor and resists the transfer of heat to the housing walls. Such stagnant air gaps make sealed devices quite susceptible to overheating and has accounted for many premature device failures.

OBJECT OF THE INVENTION

Accordingly, it is a principal object of the invention to alleviate problems resulting from excessive internal heating in devices of the type containing a motor mounted within a housing.

Another object of the invention is to provide means adapted to occupy the gap between the internal surface of a housing and a motor mounted within the housing so as to improve heat conduction from the motor to the housing walls.

Another object of the invention is to provide heat conducting means of the type described that has an initial form or state that allows it to be incorporated within the gap between the motor and the housing of a motor-containing device without concern for matching the exact dimensions of the gap and which can be transformed while in the gap to another form or state to provide a gap filling layer for conducting heat from the motor to the housing walls.

Still another object of the invention is to provide heat conducting means of the type described which is particularly adapted for use in sealed motor-containing devices such as submersible pumps.

Other objects and advantages of the invention will in part be obvious and will in part appear hereinafter.

GENERAL DESCRIPTION OF THE INVENTION

Briefly, in accordance with the present invention, a device of the type including an outer housing and motor mounted within the housing is provided with a heat conducting filler material that is disposed in the gap between the motor and internal surface of the housing to improve the transfer of heat from the motor to the housing walls. Initially, the filler material is in such a form or state that allows it to be incorporated in the gap without complicating assembly of the device and without concern for matching the exact dimensions of the gap. The filler material is subsequently transformed to another form or state while in the gap to provide a layer that conforms to the dimensions of the gap and provides a heat path from the motor to the housing walls. The filler material is also preferably a good thermal conductor, though most materials suitable for the invention have higher thermal conductivities than equivalent layers of stagnant air and thus yield the improvements contemplated by the invention.

DETAILED DESCRIPTION OF ILLUSTRATIVE EMBODIMENT

Figure 1:
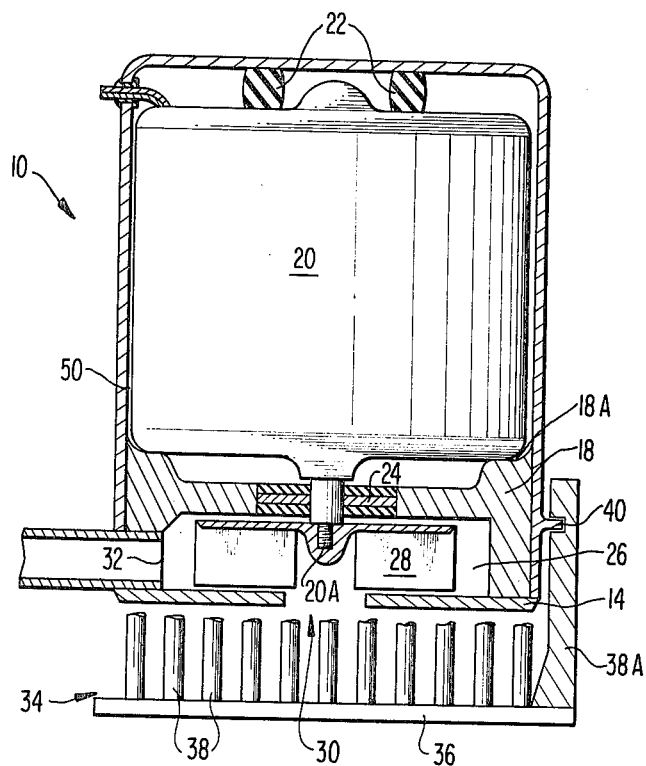
FIG. 1 is a side view, partly in section, showing a submersible pump 10 of the type in which the heat conducting filler material of the present invention is particularly useful.

Referring now to FIG. 1, a submersible pump 10 is shown as an example of a device in which the heat conducting filler material of the invention may advantageously be used. Pump 10 generally comprises a liquid-tight housing 12 and impeller casing 14 which combine to define the outer limits of the pump proper. Motor compartment 16 is defined by the internal surface 12A of the housing 12 and the upper surface 18A of a support member 18. Motor 20 is disposed in motor compartment 16 and supported between the support member 18 and a vibration dampening member 22 at the top of the compartment 16.

The shaft 20A of motor 20 extends downwardly through an arrangement of seals 24 in the support member 18 and into an impeller compartment 26 where it is affixed to an impeller 28. Rotation of impeller 28 by motor 20 causes liquid to be drawn into impeller compartment 26 through an intake port 30 in impeller casing 14. The liquid is forced out of the impeller compartment 26 through an outlet port 32 to which may be connected a suitable conduit (not shown) to conduct the liquid away from the area of the pump 10.

The pump housing 12 is supported upon a base 34 that includes a bottom plate 36 and plurality of posts 38 projecting upwardly from bottom plate 36. Selected ones of the posts 38, i.e., post 38A in FIG. 1, are designed to removably engage a peripheral lip 40 projecting from the outer surface of the housing 12. The posts 38 serve as a strainer structure in preventing the injection of excessively large foreign objects into intake port 30.

The pump housing 12 and base 34 are illustratively plastic parts which are fabricated by injection molding. The motor 20 is illustratively a DC motor which is powered from a battery power supply (not shown).

Specific commercially available examples of submersible pumps such as pump 10 are manufactured and sold by Rule Industries, Inc. of Gloucester, Mass. For further details of such pumps, reference may be had to U.S. Pat. Nos. 3,256,828 and 3,407,747.

Figure 2:
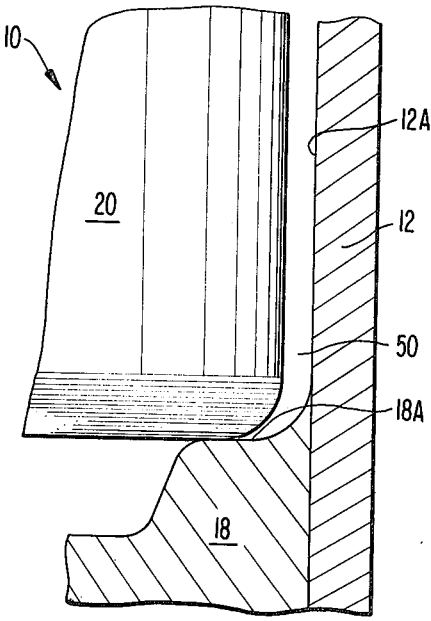
FIG. 2 is an enlarged view of the lower, right hand portion of pump 10 of FIG. 1 showing in greater detail the gap that conventionally exits between the pump motor 20 and pump housing 12.

As indicated, in FIG. 1, and as better illustrated in the enlarged view of FIG. 2, a gap 50 exists between motor 20 and the internal surface 12A of housing 12 in the pump 10. Although the actual size and shape of the gap 50 varies depending upon the particular design of the device, a gap of this type nevertheless exists in most commercial devices like pump 10 due to allowances made for dimensional tolerances during fabrication of the device components.

Specifically, the housing 12, motor 20 and various other components of the pump 10 are usually separately fabricated and then assembled at the factory to produce the pump 10. Often, the pump manufacturer purchases the motor 12 as a standard item from a motor manufacturer who sells or uses the same type motor for other applications. It is difficult and expensive to attempt to control dimensional tolerances during the fabrication of housing 12 so that the dimensions of the motor compartment 16 closely match the outer dimensions of motor 20.

Additionally, in most cases, the motor compartment 16 is intentionally made somewhat larger than the motor 20 to facilitate the insertion of motor 20 in the housing 12 during the assembly of the pump 12. In many cases, the motor compartment 16 is intentionally tapered to facilitate removal of the housing 12 from injection molding equipment. The gap 50 may thus be relatively small near the top of the housing 12 but may increase as the bottom of the housing 12 is approached. The gap 50 may also be irregular in shape because of variations in the smoothness and shape of the outer surface of the motor 20 and internal surface 12A of the housing 12.

Because housing 12 is sealed, gap 50 normally contains stagnant air which resists the transfer of heat generated by operation of motor 20 to the housing 12, and thus increases the likelihood of damage to motor 20 as a result of overheating.

In accordance with the present invention, the stagnant air in gap 50 is displaced by a heat conducting filler material that can be incorporated in the gap 50 and made to conform to the dimensions of gap 50 in a manner that does not complicate the pump assembly process. One means of achieving this result is by utilizing a filler material that is normally in a thin sheet form, and that, after being disposed in the gap 50, experiences dimensional expansion in the thickness direction either naturally or as a result of the application of external energy, such as heat. For example, various high memory thermoplastic materials are known, such as polyvinylchloride, that are susceptible to mechanical prestretching to reduce their thickness. Such materials tend to retain their reduced thickness because of internal stresses that are induced during the prestretching process. As these stresses are relieved, however, the materials tend to return to their original thickness. With most such materials, the rate at which internal stresses are relieved, and thus the rate at which expansion takes place, can be significantly accelerated by applying heat to the material.

Figure 3:
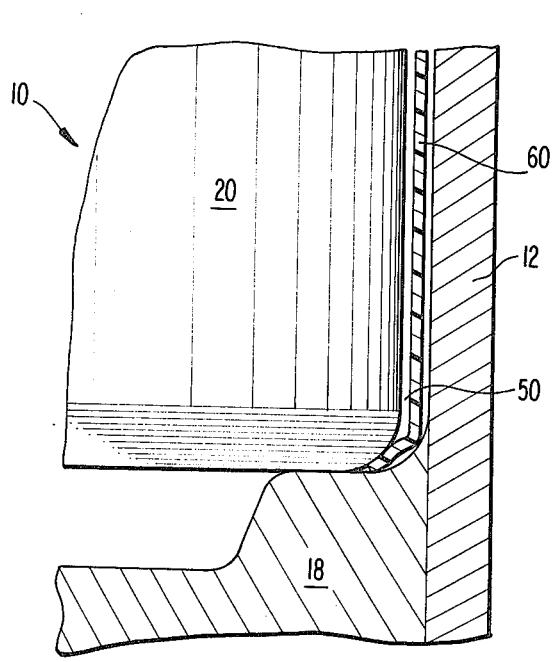
FIG. 3 is an enlarged view similar to FIG. 2 showing a layer 60 of heat conducting filler material according to the present invention disposed in the gap 50 prior to the transformation of the layer to the dimensions of the gap.

In FIG. 3, a layer 60 of such material, e.g., prestretched polyvinylchloride, is shown disposed in the gap 50. The layer 60, which may be in the form of a sheet or tape or in closed form such as a sleeve, is loosely wrapped about motor 20 prior to the insertion of motor 20 in housing 12 with the layer extending somewhat beyond the ends of the motor 20. The layer 60 is thin enough that it does not completely fill the gap 50. Thus, even though wrapped in the layer 60, the motor 20 can still be inserted easily in the housing 12. Once the motor 20 and layer 60 are positioned in the housing 12, the remaining components of the pump 10 may be assembled in the normal manner.

The layer 60 is made to fill the gap 50 either naturally or, more typically, by applying heat thereto. Heat may be applied by passing the assembled pump 10 through a suitably hot oven. Other heating equipment, such as a radiant energy heater, may be used. Alternatively, the layer 60 may be allowed to expand to fill the gap 50 in response to the heat generated as a result of operation of the motor 20. Heating the layer 60 of prestretched polyvinylchloride to a temperature of about 200° F. is generally sufficient to induce the desired expansion thereof.

Figure 4:
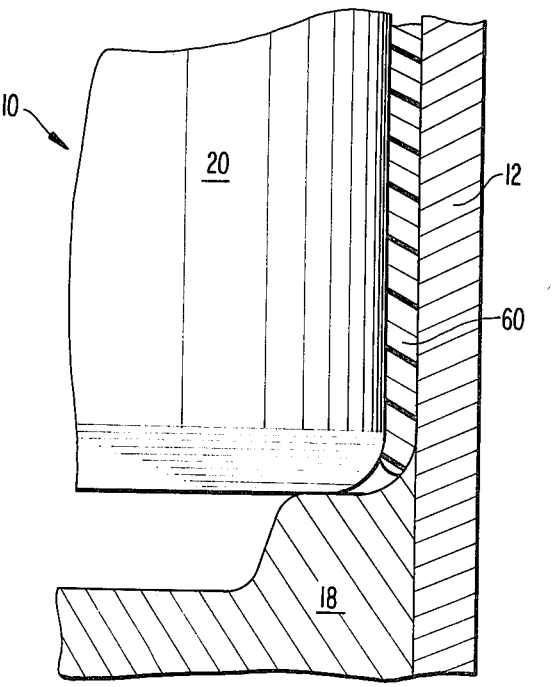
FIG. 4 is an enlarged view similar to FIGS. 2 and 3 showing the layer 60 of filler material after its transformation to the dimensions of the gap 50.

FIG. 4 illustrates the layer 60 following expansion. Provided the relative amount of expansion of the layer 60 is sufficient, the layer 60 conforms to the shape and dimensions of the gap 50 despite any irregularities therein. Heat generated by the motor 20 is thus conducted directly through the expanded layer 60 to the housing 12 where it is readily dissipated.

Generally speaking, filler materials suitable for the invention have the following basic properties;

(1) an initial form or state that allows the material to be disposed in the gap 50 without complicating the assembly of the device and without concern for matching the exact dimensions of the gap;

(2) after being disposed in the gap 50, the ability to be transformed within the gap 50 to another form or state to provide a layer that fills the gap 50 and matches the dimensions thereof and any irregularities therein; and (3) a thermal conductivity greater than an equivalent thickness of stagnant air so as to improve the heat conduction from the motor 20 to the housing 12.

As noted, high memory thermoplastic materials which are mechanically prestretched into thin sheet form and which can subsequently be activated, typically by the application of heat, to recover partially or completely their original shape and thickness are admirably suited for this purpose. The high memory material is preferably selected so that it can be activated to fill the gap 50 at temperatures well below those which cause softening or deformation of the material of the housing 12 and other plastic components of the pump 10. In addition to polyvinylchloride, other useful high memory plastics include polyethylenes, polyolefins and the material marketed by Dow Chemical Company under the trademark Saran, which is a copolymer of polyvinylchloride and vinylidenechloride. Other high memory plastics suitable for the invention will be recognized by those skilled in the art.

The same basic properties can be found in thermoplastic materials having relatively high coefficients of thermal expansion. Generally, plastics having thermal expansion co-efficients ($T_c$) greater than about $4.0 \times 10^{-5}$ in/in°F. and preferably greater than about $8.0 \times 10^{-5}$ in/in°F. are particularly advantageous. The layer 60 may thus be comprised of such a plastic, such as low or medium density polyethylene ($T_c = 8.5 \times 10^{-5} - 11.5 \times 10^{-5}$ in/in°F.) which, prior to being disposed in the gap 50, is cooled to contract its dimensions so that it fits loosely about the motor 20 within the gap 50. As the layer 60 returns to ambient temperature, it naturally expands within the gap 50. Such materials may undergo additional expansion within the gap 50 as the temperature of the material increases above ambient temperature in response to heat generated during operation of the motor 20. Thus, to avoid any damage to the housing 12 or motor 20 due to excessive expansion of the layer 60, the initial thickness of the layer 60 may be selected so that it does not completely fill the gap 50 at ambient temperatures but expands to the dimensions of the gap 50 at the normal operating temperatures within the housing 12. In addition to low and medium density polyethylene, other plastics exhibiting high thermal expansions include polybutylenes, various flexible, unfilled vinyl polymers and copolymers, ethylene-ethyl-acrylate copolymers, ethylene-vinyl-acetate copolymers and the like.

In addition to filler materials of the type described above that are initially in a relatively thin sheet form and that expand after incorporation in the gap 50, other filler materials may be used. For example, the filler material may comprise a settable liquid, such as an epoxy, that is added to the gap 50 in a liquid state and then allowed to set or harden in the gap 50. The settable liquid may be contained in a syringe or other similar device and injected into the gap 50 prior to closing the housing 12 or after closing the housing 12 through a fill opening in the housing specifically provided for this purpose. Since the material is in a liquid state when injected, it flows to fill the gap 50 and match the dimensions and irregularities thereof. Once the gap 50 is filled with the settable liquid, the liquid is allowed to set or harden in the gap to provide the heat conducting layer 60. The settable liquid may be a heat sensitive material so that it can be hardened in the gap 50 by the application of heat thereto.

It should be understood that the above detailed description is intended to illustrate rather than limit the scope of the invention. For example, although only a single layer 60 of expandable filler material is shown in FIG. 3, the filler material could be disposed about the motor 20 in multiple layers having a composite thickness such that they fit within the gap 50. It may also be desirable to treat the filler material prior to incorporation into the gap 50 so as to increase the thermal conductivity thereof. This may be accomplished by dispersing graphite or metal particles in the filler material. Additionally, while various materials have been specifically mentioned as useful filler materials, other materials suitable for use according to the invention may be recognized by those skilled in the art. Moreover, it should be clear that the principles of the invention have equal application to motorized devices other than submersible pumps of the type illustratively described above.

It is thus the object of the appended claims to cover the above and other modifications and embellishments as come within the true spirit and scope of the invention.

What we claim as new and desire to secure by Letters Patent is:

1. A method of improving heat transfer conditions in apparatus of the type including a housing having an external surface and an internal surface defining a motor compartment and a motor mounted in said motor compartment, said motor and motor compartment having relative dimensions and shapes such that a gap exists between said motor and the internal surface of said housing, said method comprising the steps of:
   A. inserting in said gap between said motor and the internal surface of said housing at least one sheet of prestretchable thermoplastic material that exhibits a memory characteristic, said sheet being in a prestretched, reduced thickness state upon insertion in said gap so that only a portion of said gap is occupied thereby; and
   B. expanding said sheet after its insertion in said gap toward its original unstressed state so that said sheet conforms substantially to the dimensions and shape of said gap and improves the transfer of heat generated by operation of said motor to said housing.

2. The method of claim 1 in which said memory thermoplastic material exhibits a heat responsive memory characteristic and in which said expanding step comprises the step of applying heat to said sheet in said gap after its insertion in said gap.

3. The method of claim 2 in which said heat applying step comprises operating said motor after the insertion of said sheet in said gap so that the heat generated by operation of said motor causes said sheet to expand in said gap.

4. The method of claim 1 in which said memory thermoplastic material that is inserted in said gap comprises a material selected from the group consisting of polyvinylchlorides, polyethylenes, polyolefins and copolymers of polyvinylchloride and vinylidenechloride.

5. The method of claim 4 in which said memory thermoplastic material that is inserted in said gap comprises polyvinylchloride.

6. The method of claim 1 in which said housing is of the type that seals said motor compartment, in which said inserting step comprises inserting said sheet of memory thermoplastic material in said prestretched, reduced thickness state in said gap during assembly of said apparatus and prior to the sealing of said motor compartment, and in which said expanding step comprises expanding said sheet in said gap subsequent to the sealing of said motor compartment.

7. The method of claim 6 wherein the apparatus in which said inserting and expanding steps are implemented comprises liquid pumping apparatus.

8. In apparatus of the type including a housing having an external surface and an internal surface defining a motor compartment and a motor mounted in said motor compartment, said motor and motor compartment having relative dimensions and shapes such that a gap exists between said motor and the internal surface of said housing, a material disposed in said gap for improving the transfer of heat between said motor and the internal surface of said housing and comprising at least one sheet of prestretchable thermoplastic material that exhibits a memory characteristic, said sheet being in a prestretched, reduced thickness state upon insertion in said gap so that only a portion of said gap is occupied thereby, said sheet being expandable after its insertion in said gap toward its original unstressed state to conform substantially to the dimensions and shape of said gap and to improve the transfer of heat generated by operation of said motor to said housing.

9. The apparatus of claim 8 in which said memory thermoplastic material exhibits a heat responsive memory characteristic in that said sheet is expandable in said gap in response to the application of heat thereto.

10. The apparatus of claim 9 in which said heat responsive memory thermoplastic material is of the type that is expandable in said gap in response to the heat generated by operation of said motor.

11. The apparatus of claim 8 in which said memory thermoplastic material comprises a material selected from the group consisting of polyvinylchlorides, polyethylenes, polyolefins, and co-polymers of polyvinyl chloride and vinylidenechloride.

12. The apparatus of claim 11 in which said memory thermoplastic material comprises polyvinylchloride.

13. The apparatus of claim 8 in which said housing comprises a sealed housing.

14. The apparatus of claim 8 further including liquid pumping means energized by said motor.

* * * * *